US006952740B1

(12) United States Patent
Cain et al.

(10) Patent No.: US 6,952,740 B1
(45) Date of Patent: Oct. 4, 2005

(54) APPARATUS AND METHOD OF MAINTAINING A ROUTE TABLE

(75) Inventors: Bradley Cain, Cambridge, MA (US); Thomas Hardjono, Arlington, MA (US)

(73) Assignee: Nortel Networks Limited, (CA)

( * ) Notice: Subject to any disclaimer, the term of this patent is extended or adjusted under 35 U.S.C. 154(b) by 0 days.

(21) Appl. No.: 09/412,447

(22) Filed: Oct. 4, 1999

(51) Int. Cl.[7] .............................................. G06F 15/173
(52) U.S. Cl. ...................... 709/238; 709/239; 709/240; 370/418; 707/10
(58) Field of Search .............................. 709/238, 241, 709/242; 370/418; 707/10

(56) References Cited

U.S. PATENT DOCUMENTS

| | | | | |
|---|---|---|---|---|
| 5,473,603 A | | 12/1995 | Iwata | |
| 5,751,954 A | * | 5/1998 | Saito | ...................... 395/200.15 |
| 5,802,054 A | * | 9/1998 | Bellenger | ................... 370/401 |
| 5,802,316 A | | 9/1998 | Ito | |
| 5,881,241 A | * | 3/1999 | Corbin | .................. 395/200.68 |
| 5,916,306 A | * | 6/1999 | Ruiz | ........................... 709/242 |
| 6,041,049 A | * | 3/2000 | Brady | ......................... 370/351 |
| 6,154,444 A | * | 11/2000 | Masu et al. | ................. 370/225 |
| 6,167,444 A | * | 12/2000 | Boden et al. | ............... 709/223 |
| 6,275,492 B1 | * | 8/2001 | Zhang | ......................... 370/392 |
| 6,304,548 B1 | * | 10/2001 | Shaffer et al. | .............. 370/229 |
| 6,385,649 B1 | * | 5/2002 | Draves et al. | ............. 709/224 |
| 6,393,486 B1 | * | 5/2002 | Pelavin et al. | ............. 709/238 |

FOREIGN PATENT DOCUMENTS

EP          00650108.4          11/2001

* cited by examiner

*Primary Examiner*—Zarni Maung
*Assistant Examiner*—Adnan Mirza
(74) *Attorney, Agent, or Firm*—Steubing McGuinness & Manaras LLP (57) ABSTRACT

An apparatus and method of maintaining a route table within a network device lists data identifying specific routes of interest that have changed. The routes of interest may be within a given set of routes. Specifically, after the given set of routes are registered with the apparatus, it is determined if any of the routes in the given set has changed. Data identifying each route in the given set of routes that has been determined to change then is listed.

30 Claims, 6 Drawing Sheets

APPARATUS AND METHOD OF MAINTAINING A ROUTE TABLE

FIELD OF THE INVENTION

The invention generally relates networks and, more particularly, the invention relates to managing a route table within a network device.

BACKGROUND OF THE INVENTION

Information generally is transmitted across a network (e.g., the Internet) from a source to a destination over a specific route. A route typically includes one or more routing devices (e.g., routers) that each forward the information along the route. To that end, each router typically includes a route table that stores various routes available in the network. As is known in the art, such route information often changes and thus, must be periodically updated. Routers therefore typically update other routers in the network by transmitting route information via one or more inter-router protocols.

Each time a specific route is updated on a given router, all entries in the route table must be traversed until the specific route is located. This process can be time consuming, consequently degrading router performance. The art has responded to this problem by providing an apparatus that indicates whether at least one route of interest to a specific protocol has changed. In a manner similar to the problem that it solves, this solution requires that many entries in the route table be traversed until a route of interest (to a specific protocol) is located. Although an improvement over many other prior art systems, this solution also can be time consuming, thus degrading router performance.

SUMMARY OF THE INVENTION

In accordance with one aspect of the invention, an apparatus and method of maintaining a route table within a network device lists data identifying specific routes of interest that have changed. The routes of interest may be within a given set of routes. Specifically, after the given set of routes are registered with the apparatus, it is determined if any of the routes in the given set has changed. Data identifying each route in the given set of routes that has been determined to change then is listed.

In preferred embodiments, the given set of routes is associated with a given routing protocol. If any one of the given routes is determined to have changed, then a first data value indicating that at least one of the routes in the given set of routes has changed may be generated. Each route in the given set of routes may include a sequence number that is utilized to generate the first data value. Such first data value preferably is a checksum. The route table also may include a list data value indicating whether the given route (within the given set) has been listed. The list data value may be a single bit associated with the given set of routes. In some embodiments, a route is listed by first determining if the list data value has been set, and then listing the given route if it has been determined that the list data value has not been set. The given route thus is not listed if it has been determined that the list data value has been set. An un-set list data value may be set just before or after the given route is listed. Among other things, the listed data may include a pointer to a route in the route table. Once the list is formed, it may be accessed to determine each route that has changed. This list may be accessed at any time to determine which routes have changed, such as once during each of a selected polling interval.

In accordance with another aspect of the invention, an apparatus and method of determining if a given route (of a given set of routes) in a route table has changed accesses a list of routes associated with the given set of routes. It then is determined if data identifying the given route is listed in the list of routes. If determined to be in the list of routes, then the given route is deemed to have changed.

The list preferably includes data identifying at least one route in the route table. Among other ways of identifying a route, the data identifying the given route may include a pointer to the route in the route table. The given set of routes may be associated with a given protocol. In a manner similar to other aspects of the invention, the list of routes may be accessed at any time, such as once during every polling interval. In some embodiments, a check data value is examined to determine if any one of the routes in the given set of routes has changed. The list of routes thus is accessed after it is determined that any one of the routes in the given set has changed. In preferred embodiments, the check data value is a checksum.

Preferred embodiments of the invention are implemented as a computer program product having a computer usable medium with computer readable program code thereon. The computer readable code may be read and utilized by the computer system in accordance with conventional processes.

BRIEF DESCRIPTION OF THE DRAWINGS

The foregoing and advantages of the invention will be appreciated more fully from the following further description thereof with reference to the accompanying drawings wherein.

DESCRIPTION OF PREFERRED EMBODIMENTS

Figure 1:
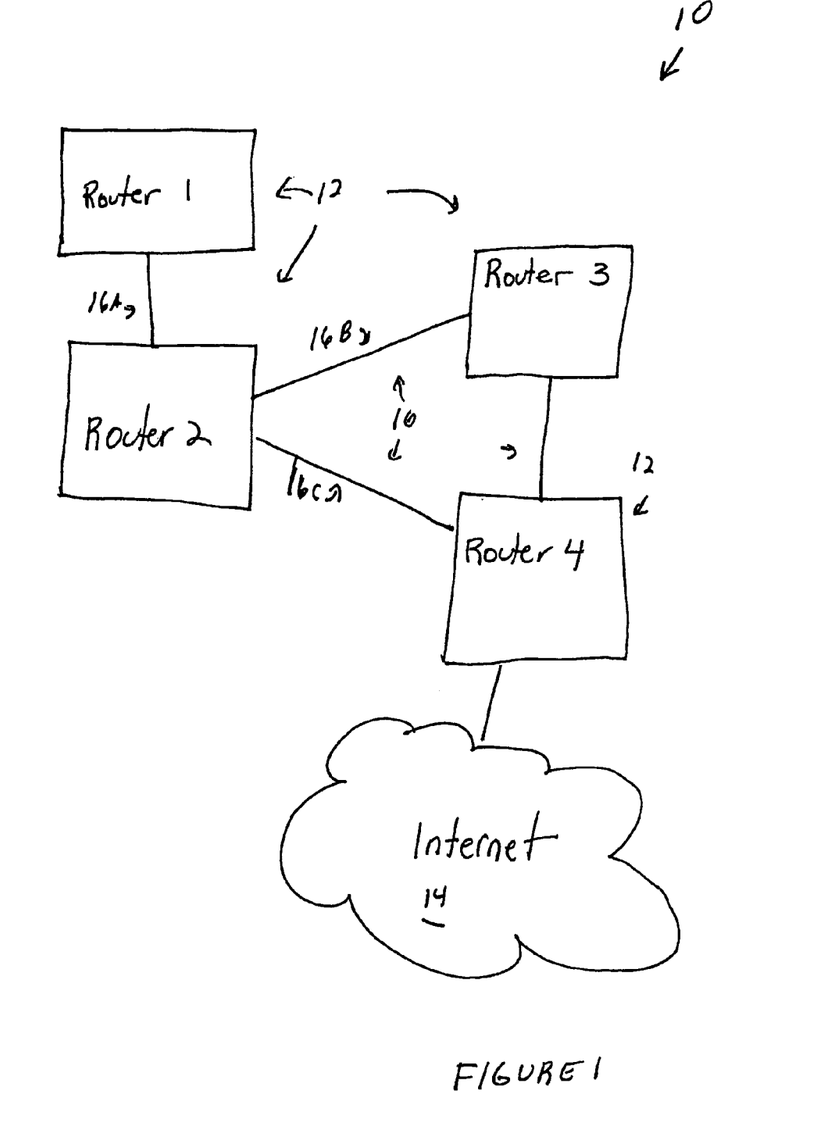
FIG. 1 schematically shows an exemplary network arrangement in which preferred embodiments of the invention may be implemented.

FIG. 1 schematically shows an exemplary network arrangement 10 in which preferred embodiments of the invention may be implemented. Specifically, the network 10 includes a plurality of routers 12 (identified as router 1, router 2, router 3 and router 4) that either are directly or indirectly coupled with the Internet 14. Among other things, each router 12 may be coupled to a local area network (not shown), or may be an intermediate router 12 that merely forwards data packets to other network devices. In preferred embodiments, the routers 12 are executing the well known Internet Protocol ("IP"), which specifies the format of data packets forwarded across the Internet 14.

Each of the routers 12 is coupled to at least one other router 12 via a link 16. For example, router 1 is coupled to router 2 by a first link 16A, while router 2 is coupled to router 3 by a second link 16B, and router 4 by a third link 16C. Accordingly, as known by those skilled in the art, data packets may be forwarded between any of the routers 12 and/or the Internet 14 via various combinations of these links 16 (i.e., routes). For example, router 1 may forward a data packet to router 4 via a route that traverses router 2 and router 3. Alternatively, router 1 may forward a data packet to router 4 via a route that traverses router 2 only. All routes to the Internet 14, however, must include router 4.

Figure 2:
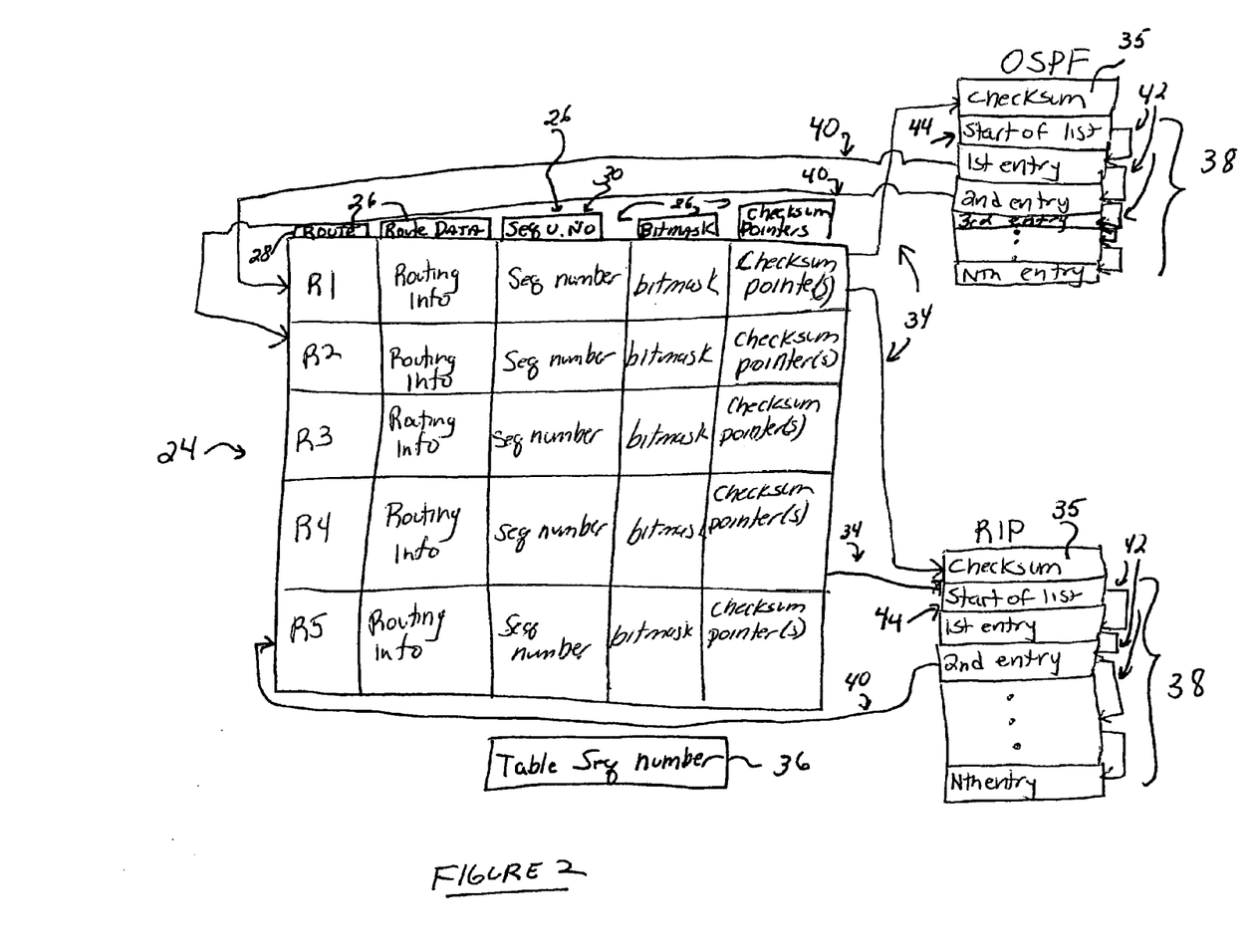
FIG. 2 schematically shows a route table that is configured in accord with preferred embodiments of the invention.

Each router 12 includes a route table that has a route entry for many of the available routes in the network. FIG. 2 schematically shows a route table 24 that is configured in accord with preferred embodiments of the invention. Specifically, the route table 24 includes a plurality of fields 26, including a route field 28 for entering a route, and a plurality of other fields for entering data associated with each entered route. The data associated with any given route includes routing information conventionally stored in a route table 24 (e.g., the metric, mask, etc . . . ), a sequence number 30 that is incremented each time the given route is updated, a bitmask 32 that facilitates the process of listing changed routes (discussed below), and one or more checksum pointers 34 (that point to one or more checksums 35) for determining whether the given route has been updated (discussed in the paragraph immediately below). In addition, the route table 24 also may include a route table sequence number 36 that is changed each time any entry in the route table 24 is updated.

The checksum pointers 34 are utilized to permit various inter-router protocols to register one or more routes of interest with the route table 24. A protocol may register routes in any manner, such as by forwarding a message that specifies registration of specific routes. Upon receipt of such message, the specific routes may be stored in memory for subsequent use. Accordingly, as shown by example in FIG. 2, the routes that are registered by a given protocol each have a checksum pointer 34 that points to a checksum 35 for the given protocol. All of the routes that are registered with the route table 24 by any protocol thus are referred to herein as a "registered set" of routes. A registered set can have no routes, or many routes. Exemplary protocols that may be utilized with preferred embodiments include the Routing Information Protocol ("RIP"), the Open Shortest Path First protocol ("OSPF"), and the Border Gateway Protocol ("BGP"). It should be noted, however, that discussion of these protocols is by example only and is not intended to limit the scope of the invention.

The checksum 35 of each protocol is changed after one of the routes of its registered set is changed. Accordingly, it can be easily determined if at least one route in a registered set of a given protocol has changed by determining if such given protocol's checksum 35 is different from an earlier recorded checksum. For example, FIG. 2 shows a checksum 35 for the OSPF protocol, and a checksum 35 for the RIP protocol. Route 4 includes a checksum pointer 34 that points to the RIP checksum 35. Accordingly, if route 4 is changed, only the RIP checksum 35 is changed. The OSPF checksum 35 is not changed. A route is considered to have changed under many well recognized circumstances, such as when its metric has changed, when it is removed from the table as a route, or when it is added to the table. As shown in FIG. 2, the checksum pointers 34 can point to no checksums 35, or many checksums 35. For additional details relating to the use of checksums 35, see co-pending U.S. patent application entitled, "METHOD AND APPARATUS FOR EXCHANGE OF ROUTING DATABASE INFORMA-TION", having Ser. No. 09/322,905, filed Jun. 1, 1999, and naming Brad Cain and Thomas Hardjono as inventors, the disclosure of which is incorporated herein, in its entirety, by reference.

In accord with preferred embodiments of the invention, each checksum 35 (i.e., for each protocol) includes a list 38 of routes (within the registered set for that protocol) that have changed. In preferred embodiments, as shown in FIG. 2, the list 38 includes a linked list of pointers that each point to route entries (in the route table 24) that have changed. More particularly, each entry in the list 38 includes a route pointer 40 that points to a route that has changed, and a next entry pointer 42 that points to the next entry in the list 38. For example, the OSPF list 38 of FIG. 2 includes a list start pointer 44 that merely is a pointer to the first entry in the list 38. Upon inspection of the pointers in the first entry, it can be determined that the first route has changed, and that the next entry is the second entry in the list 38. Upon examination of the pointers in the second entry, it can be determined that the second route has changed, and that the next entry is the third entry. The entire list 38 thus is traversed in this manner until all changed routes have been determined.

It should be noted that although a list start pointer 44 is utilized, the list 38 may include route entries only. Moreover, the list 38 can be stored in contiguous memory locations, noncontiguous memory locations, or any other memory configuration. It also should be noted that although only two lists 38 are shown, various embodiments of the invention can utilize many more lists 38. In fact, use of a list 38 is an exemplary memory structure since any data structure capable of performing the noted listing function can be utilized. The term "list" thus is used herein to denote any such structure.

Figure 3:
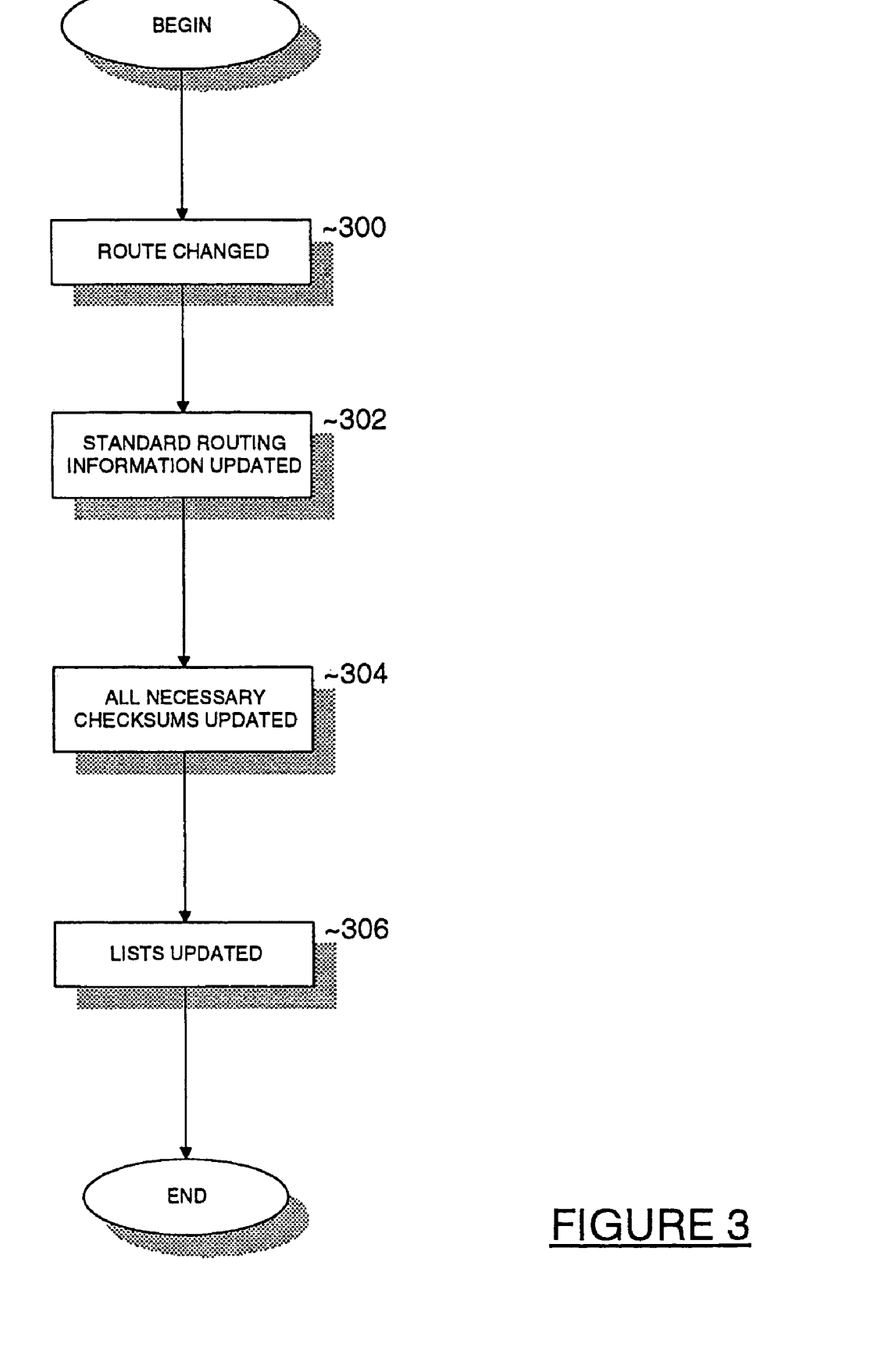
FIG. 3 shows a preferred process of updating a route change list (FIG. 2) when a given route is changed.

FIG. 3 shows a preferred process of updating the list 38 as a route is changed. This process is repeated each time a route is changed. Prior to executing this process, as suggested above, each protocol registers its registered set with the route table 24. The process thus begins at step 300 in which a given route is changed. Standard routing information, such as the metric and route sequence number 30, then is updated for the given route within the route table 24 (step 302).

All necessary checksums 35 then are updated at step 304 to reflect the fact that the given route has changed. To that end, it is determined which registered sets include the given route. For example, RIP and OSPF both may have included the given route. In such case, the checksum 35 for both RIP and OSPF each are changed. In preferred embodiments, checksums 35 are changed by applying a logical operation to both the checksum 35 and the route sequence number 30 of the route that has changed. For example, the checksum 35 and route sequence number 30 of the given route may be processed by an EXCLUSIVE OR (XOR) gate to produce a new checksum 35. Other methods of changing the checksum 35 also may be utilized.

Figure 4:
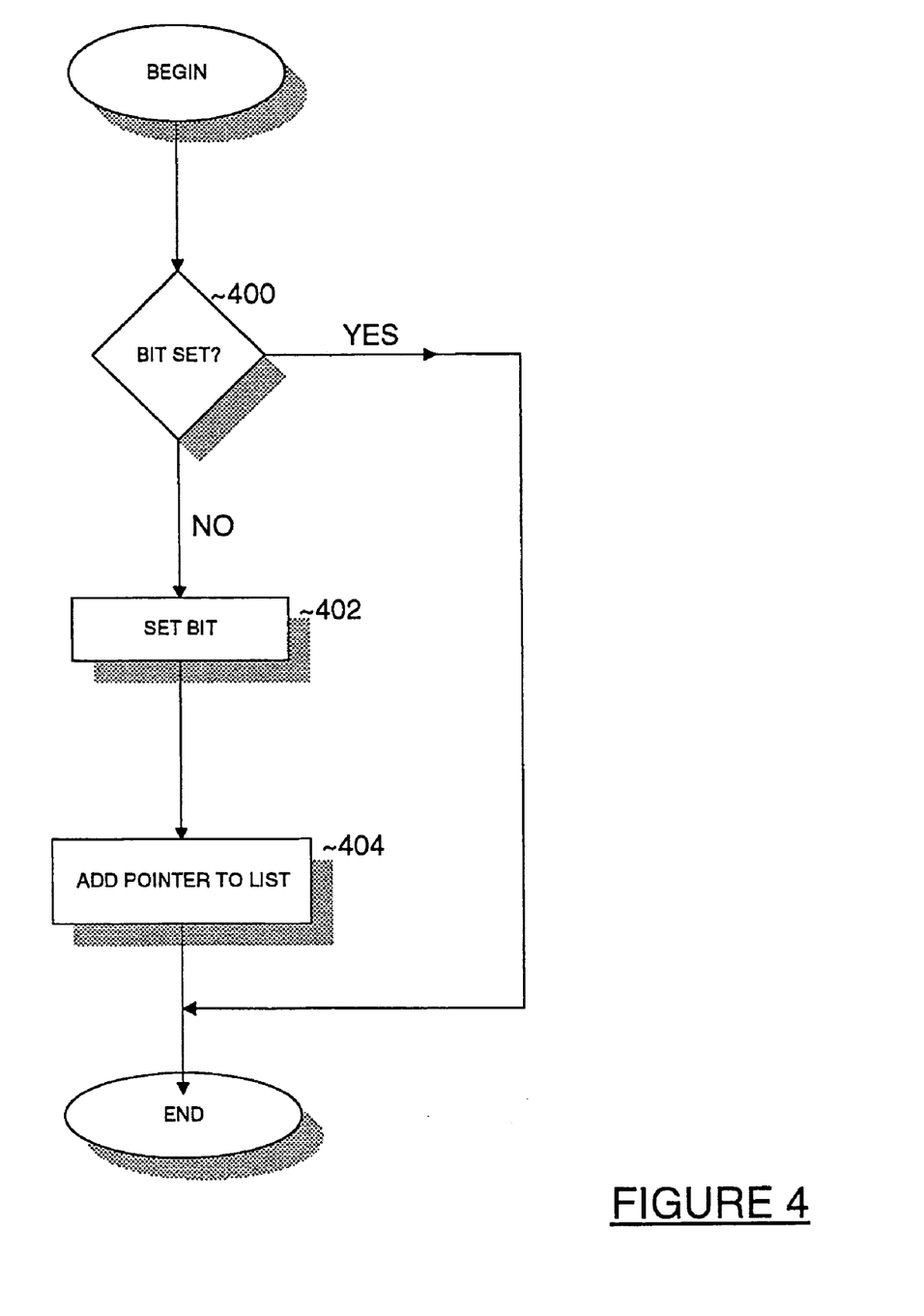
FIG. 4 shows a preferred process of adding the given route to a given route change list shown in FIG. 2.
Figure 5:
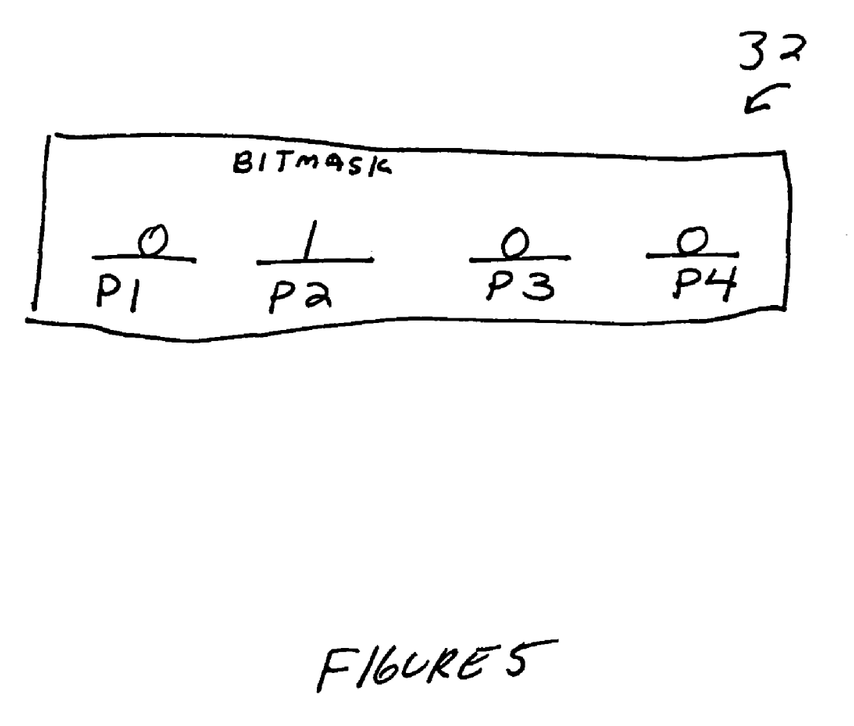
FIG. 5 schematically shows a bitmask that may be utilized in the route table shown in FIG. 2.

The process then continues to step 306 in which the lists 38 of each protocol that registered the given route are updated. FIG. 4 shows a preferred process of adding the given route to a given protocol list 38. The process begins at step 400 in which it is determined if the bitmask entry (FIG. 2) for the given protocol is set to "1." As shown in FIG. 5, the bitmask 32 for the given route preferably includes one or more bits that indicate whether the route has been added to the list 38 for the given protocol. For example, the bitmask 32 in FIG. 5 includes a single bit for each of four protocols. If the bit assigned to the given protocol is set to "1", then the given route has been added to the list 38.

Conversely, if the bit assigned to the given protocol is set to "0", then the given route has not been added to the list 38. The exemplary bitmask 32 shown in FIG. 5 thus shows that the given route has been added to the list 38 of protocol 2, but not to the list 38 of protocols 1, 3, or 4. Of course, some embodiments deem the given route to be added to the list 38 when a bit is set to "0", and also deem the given route to not be added to the list 38 when such bit is set to "1."

Checking the bitmask 32 before adding the given route to the list 38 ensures that the given route will not be added to the list 38 more than once. Note that since the primary function of the list 38 is to identify the routes that have changed, it is not necessary to list a given route more than once. Accordingly, returning to step 400, if it is determined that the bit is set (i.e., the given route already has been added to the list 38 during some previous cycle), then the process ends. Conversely, if it is determined at step 400 that the bit is not set, then the process continues to step 402 in which the bit is set, thus indicating that the given route is in the list 38 for the given protocol.

The list 38 then is updated at step 404 by adding the appropriate pointers to the list 38. Specifically, a new entry is added to the list 38, and the next entry pointer 42 in the last entry in the list 38 is set to point to the new entry. In addition, a route pointer 40 is added to the new entry to point to the location in the route table 24 of the given route, thus indicating that it has changed. In some embodiments, the next entry pointer 42 of the new entry points to a null pointer, thus indicating that it is the last entry in the list 38. It should be noted that although the bit is set at an earlier step (step 402) than the step that the pointers are added to the list 38 (step 404), these steps may be executed in any order, or at the same time.

Figure 6:
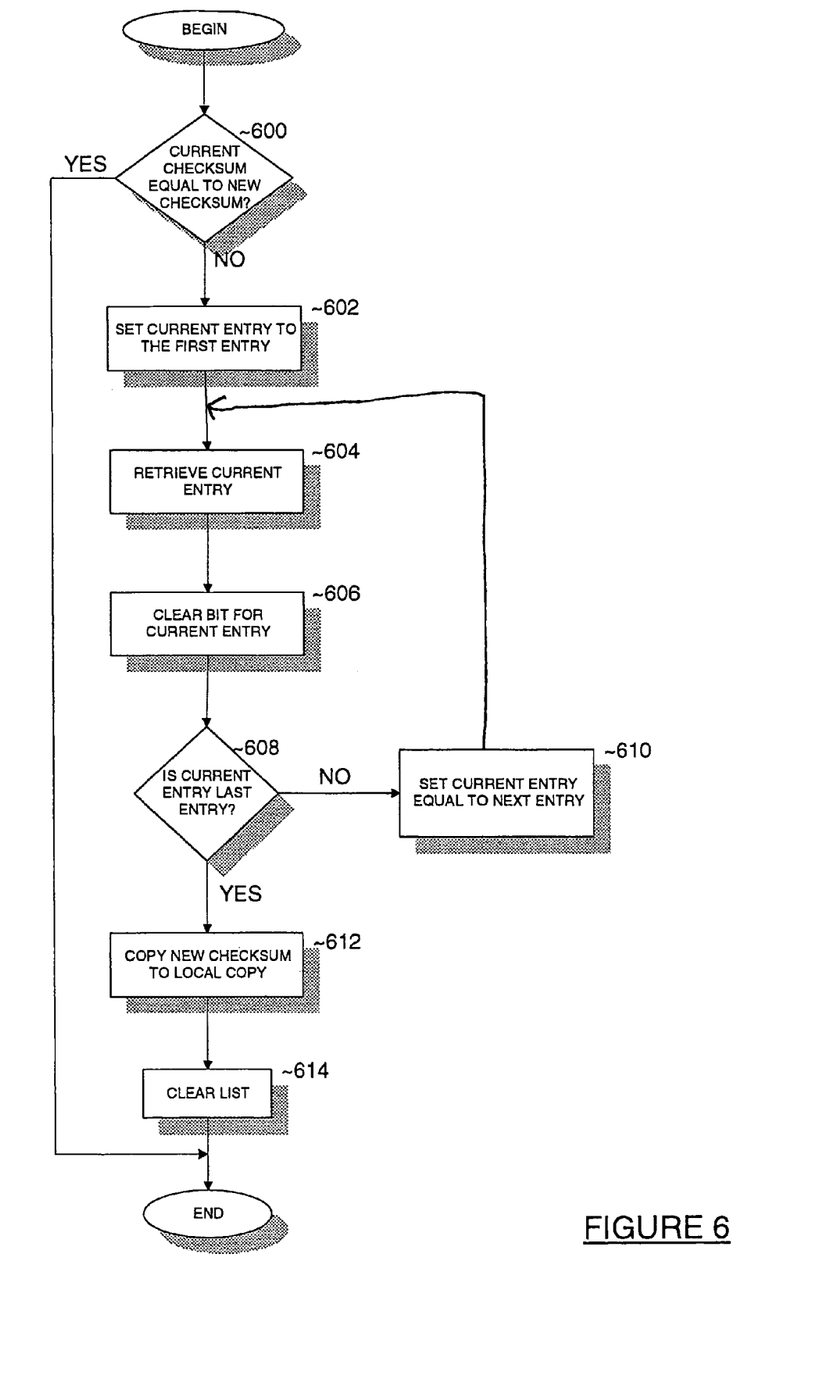
FIG. 6 shows a preferred process of determining changed routes in the registered set of a given protocol.

FIG. 6 shows a preferred process of determining which routes (if any) in a given protocol's registered set have changed. This process may be executed as a polling process, an interrupt process, or other process. The process begins at step 600 in which it is determined if the checksum 35 that is maintained by the route table 24 (FIG. 2) for the given protocol is the same as a local copy of the checksum 35. See step 612, which is discussed below, for additional details of the local copy of the checksum 35. If the two checksums 35 are the same, then no changes have occurred to any routes in the given protocol's registered set. Conversely, if the two checksums 35 are not the same, then at least one route in the given protocol's registered set has changed. In such case, the process continues to step 602 in which a "current entry" variable is set to be the first entry in the given protocol's list 38. To that end, the list start pointer 44 in the list 38 is located and utilized to determine the first entry in the list 38. The first entry thus is set to be the "current entry."

Once the current entry is located, the route pointer 40 of such entry is utilized in step 604 to determine one of the routes that has changed (i.e., the current entry is retrieved). For example, as discussed above, when accessing the OSPF list 38 in FIG. 2, the route pointer 40 of the first pointer (i.e., the current entry) points to the first route in the route table 24.

The process then continues to step 606 in which the bit in the bitmask 32 of the current entry for the given protocol is cleared (i.e., set to "0"). For example, for the first entry in the OSPF list 38 of FIG. 2, the OSPF bit in the bitmask 32 of route 1 is cleared, thus indicating that such entry has been read by the OSPF protocol. The process continues to step 608 in which it is determined if the current entry is the last entry in the list 38. This may be determined by checking the next entry pointer 42 to determine if it points to a null value.

If determined not to be the last entry in the list 38, then the process continues to step 610 in which the current entry variable is set to be equal to the next entry in the list 38. To that end, the current entry variable is set to be the entry to which the next entry pointer 42 points. The process then loops back to step 604 to retrieve the current entry.

Conversely, if it is determined at step 608 that the current entry is the last entry, then the process continues to step 612, in which the new checksum 35 is copied as a local copy of the checksum 35 for the given protocol. As noted above and in the above noted prior filed U.S. patent application, the local copy of the checksum 35 is utilized to determine if any entries in the registered set for the given protocol have changed. The process then continues to step 614 in which the entire list 38 is cleared. In some embodiments, the list 38 may be cleared by setting the list start pointer 44 to point to a null value, and then clearing the memory locations of the other pointers in the list 38. Other well known methods of clearing the list 38 also may be utilized.

It should be noted that various details of the invention are discussed by example and not intended to limit specific embodiments of the invention. For example, data values other than checksums 35 may be utilized to determine if any route in registered set has changed. Moreover, as previously suggested, various steps in the discussed methods may be performed in a different order than that described, or performed simultaneously.

Preferred embodiments of the invention may be implemented in any conventional computer programming language. For example, preferred embodiments may be implemented in a procedural programming language (e.g., "C") or an object oriented programming language (e.g., "C++" or "JAVA"). Alternative embodiments of the invention may be implemented as preprogrammed hardware elements (e.g., application specific integrated circuits), or other related components.

Alternative embodiments of the invention may be implemented as a computer program product for use with a computer system. Such implementation may include a series of computer instructions fixed either on a tangible medium, such as a computer readable media (e.g., a diskette, CD-ROM, ROM, or fixed disk), or transmittable to a computer system via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions preferably embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web).

Although various exemplary embodiments of the invention have been disclosed, it should be apparent to those skilled in the art that various changes and modifications can be made that will achieve some of the advantages of the invention without departing from the true scope of the invention. These and other obvious modifications are intended to be covered by the appended claims.

We claim:

1. A method of maintaining a route table in a routing device, the route table including a plurality of routes between network devices in a network, the method comprising:

registering a given set of routes of the plurality of routes between network devices in a network, wherein the given set of routes is associated with a given routing protocol, and wherein the given set of routes is a subset of the plurality of routes between the network devices in the network;

determining if any of the routes in the given set of routes has changed;

listing data identifying each route in the given set of routes that has been determined to be changed, wherein the act of listing includes storing a pointer to each route in the given set of routes that has been determined to be changed in a list of changed routes for the given set of routes associated with the given routing protocol; and generating a first value indicating that at least one of the routes in the given set of routes has changed, wherein each route in the set of routes includes an associated sequence number, the first value being a checksum that is a function of at least one of the sequence numbers.

2. The method as defined by claim 1 wherein a given route in the table includes a list data value indicating whether the given route has been listed, the given route being in the given set of routes.

3. The method as defined by claim 2 wherein the list data value is a single bit associated with the given set of routes.

4. The method as defined by claim 2 wherein the act of listing comprises:

determining if the list data value has been set; and listing the given route if it has been determined that the list data value has not been set, the given route not being listed if it has been determined that the list data value has been set.

5. The method as defined by claim 4 wherein the act of listing further comprises:

setting the list data value.

6. The method as defined by claim 1 further comprising:

accessing the list to determine each route that has changed.

7. The method as defined by claim 6 wherein the list is accessed once during each of a selected polling interval.

8. An apparatus for maintaining a route table in a routing device, the route table including a plurality of routes between network devices in a network, the apparatus comprising:

a registration module that registers a given set of routes of the plurality of routes between network devices in a network, wherein the given set of routes is associated with a given routing protocol, and wherein the given set of routes is a subset of the plurality of routes between the network devices in the network;

a route examiner operatively coupled with the registration module, the route examiner determining if any of the routes in the given set of routes has changed; and a list generator operatively coupled with the route examiner, the list generator listing data identifying each route in the given set of routes that has been determined to have changed, wherein the listing includes storing a pointer to each route in the given set of routes that has been determined to be changed in a list of changed routes for the given set of routes associated with the given routing protocol, and wherein the listing further includes generating a first value indicating that at least one of the routes in the given set of routes has changed, wherein each route in the set of routes includes an associated sequence number, the first value being a checksum that is a function of at least one of the sequence numbers.

9. The apparatus as defined by claim 8 further including a list data value generator operatively coupled with the list generator, the list data value generator generating a list data value indicating whether a given route has been listed, the given route being in the given set of routes.

10. The apparatus as defined by claim 9 wherein the list data value is a single bit associated with the given set of routes.

11. The apparatus as defined by claim 9 wherein the list generator comprises:

a determiner that determines if the list data value for the given route has been set; and a lister that lists data identifying the given route if it has been determined that the list data value has not been set, data identifying the given route not being listed if it has been determined that the list data value has been set.

12. The apparatus as defined by claim 11 wherein the list generator further comprises:

a list data value setter that sets the list data value.

13. The apparatus as defined by claim 8 further comprising:

a list accessing module that accesses the list to determine each route that has changed.

14. The apparatus as defined by claim 13 further comprising a poller that accesses the list once during each of a selected polling interval.

15. A computer program product for use on a computer system for maintaining a route table in a routing device, the route table including a plurality of routes between network devices in a network, the computer program product comprising a computer usable medium having computer readable program code thereon, the computer readable program code including:

program code for registering a given set of routes of the plurality of routes between network devices in a network, wherein the given set of routes is associated with a given routing protocol, and wherein the given set of routes is a subset of the plurality of routes between the network devices in the network;

program code for determining if any of the routes in the given set of routes has changed;

program code for listing data identifying each route in the given set of routes that has been determined to have changed, wherein the act of listing includes storing a pointer to each route in the given set of routes that has been determined to be changed in a list of changed routes for the given set of routes associated with the given routing protocol; and program code for generating a first value indicating that at least one of the routes in the given set of routes has changed, wherein each route in the set of routes includes an associated sequence number, the first value being a checksum that is a function of at least one of the sequence numbers.

16. The computer program product as defined by claim 15 wherein a given route in the table includes a list data value indicating whether the given route has been listed, the given route being in the given set of routes.

17. The computer program product as defined by claim 16 wherein the list data value is a single bit associated with the given set of routes.

18. The computer program product as defined by claim 16 wherein the program code for listing comprises:
   program code for determining if the list data value has been set; and
   program code for listing the given route if it has been determined that the list data value has not been set, the given route not being listed if it has been determined that the list data value has been set.

19. The computer program product as defined by claim 18 wherein the program code for listing further comprises:
   program code for setting the list data value.

20. The computer program product as defined by claim 15 further comprising:
   program code for accessing the list to determine each route that has changed.

21. The computer program product as defined by claim 20 wherein the list is accessed once during each of a selected polling interval.

22. A method of determining if a given route table has changed, the route being in a given set of routes of a plurality of routes between network devices in a network, the method comprising:
   accessing a list of routes associated with the given set of routes of the plurality of routes between network devices in a network, wherein the given set of routes is associated with a given routing protocol, and wherein the given set of routes is a subset of the plurality of routes between the network devices in the network, wherein the list of routes includes a pointer to a route table entry for each route in the given set of routes that has been determined to have been changed in the given set of routes associated with the given routing protocol;
   determining if data identifying the given route is listed in the list of routes, the given route being deemed to have changed if determined to be listed in the list of routes, and
   wherein the list of routes includes a first value indicating that at least one of the routes in the given set of routes has changed, wherein each route in the set of routes included an associated sequence number, the first value being a checksum that is a function of at least one of the sequence numbers.

23. The method as defined by claim 22 wherein the list of routes is accessed once during every polling period.

24. The method as defined by claim 22 wherein the data identifying the given route includes a pointer to the route in the route table.

25. An apparatus for determining if a given route in a route table has changed, the route being in a given set of routes of a plurality of routes between network devices in a network, the apparatus comprising:
   a list accessing module that accesses a list of routes associated with the given set of routes of the plurality of routes between network devices in a network, wherein the given set of routes is associated with a given routing protocol, and wherein the given set of routes is a subset of the plurality of routes between the network devices in the network, wherein the list of routes includes a pointer to a route table entry for each route in the given set of routes that has been determined to have been changed in the given set of routes associated with the given routing protocol;
   a route examiner operatively coupled with the list accessing module, the route examiner determining if data identifying the given route is listed in the list of routes, the given route being deemed to have changed if determined to be listed in the list of routes; and
   wherein the list of routes includes a first value indicating that at least one of the routes in the given set of routes has changed, wherein each route in the set of routes includes an associated sequence number, the first value being a checksum that is a function of at least one of the sequence numbers.

26. The apparatus as defined by claim 25 further comprising a poller that accesses the list once during every polling period.

27. The apparatus as defined by claim 25 wherein the data identifying the given route includes a pointer to the route in the route table.

28. A computer program product for use on a computer system for determining if a given route in a route table has changed, the route being in a given set of routes of a plurality of routes between network devices in a network, the computer program product comprising a computer usable medium having computer readable program code thereon, the computer readable program code including:
   program code for accessing a list of routes associated with the given set of routes of the plurality of routes between network devices in a network, wherein the given set of routes is associated with a given routing protocol, and wherein the given set of routes is a subset of the plurality of routes between the network devices in the network, wherein the list of routes includes a pointer to a route table entry for each route in the given set of routes that has been determined to have been changed in the given set of routes associated with the given routing protocol;
   program code for determining if data identifying the given route is listed in the list of routes, the given route being deemed to have changed if determined to be listed in the list of routes; and
   wherein the list of routes includes a first value indicating that at least one of the routes in the given set of routes has changed, wherein each route in the set of routes includes an associated sequence number, the first value being a checksum that is a function of at least one of the sequence numbers.

29. The computer program product as defined by claim 28 wherein the list of routes is accessed once during every polling period.

30. The computer program product as defined by claim 28 wherein the data identifying the given route includes a pointer to the route in the route table.

* * * * *